United States Patent [19]
Riccio

[11] 3,916,534
[45] Nov. 4, 1975

[54] DRIVER EDUCATION TEACHING AND TESTING DEVICE

[76] Inventor: Edward W. Riccio, 17 Stanhope Drive, Barrington, R.I. 02806

[22] Filed: Mar. 19, 1974

[21] Appl. No.: 452,542

[52] U.S. Cl. ............................................. 35/11
[51] Int. Cl.² ...................................... G09B 9/04
[58] Field of Search ................................. 35/11

[56] References Cited
UNITED STATES PATENTS

| | | | |
|---|---|---|---|
| 2,979,831 | 4/1961 | Bullock | 35/11 |
| 3,000,111 | 9/1961 | Heylmun | 35/11 |
| 3,594,921 | 7/1971 | Quicker | 35/11 |
| 3,795,990 | 3/1974 | Quicker | 35/11 |

*Primary Examiner*—Wm. H. Grieb
*Attorney, Agent, or Firm*—Salter & Michaelson

[57] ABSTRACT

An instructive device for use in driver education and driver improvement applications for testing perception and reaction times of a student, and for measuring the student'perception and reaction time as influenced by simulated conditions of blood alcohol concentrations; and relating the measured perception and reaction time of the student to vehicular stopping times and distances under various combinations of road surface conditions and vehicular speeds.

8 Claims, 2 Drawing Figures

DRIVER EDUCATION TEACHING AND TESTING DEVICE

BACKGROUND OF THE INVENTION

The present invention relates to a psycho-physical teaching and testing device for use in driver education and driver improvement applications.

Because of high accident rates involving new drivers, the Federal Highway Safety Adminstration (Highway Safety Act of 1966. P.L. 89-564) requires that all states provide courses in driver education in order to orient the new driver to problems normally experienced under actual driving conditions and to better acquaint the new driver with safety requirements as required by law.

In addition, it is generally understood by traffic courts and insurance agencies that the most common cause of traffic accidents is driver error, and the most common driver error is inadequate following distance or tailgating which causes rear-end collisions and account for 40% of all reported accidents. For this reason the present invention which teaches the relationship between perception time, reaction time, and stopping time and stopping distance when a vehicle is operated under a multiplicity of vehicluar speed and road surface conditions relates directly to teaching and testing applications for driver improvement courses, court directed traffic clinics, and insurance company assigned risk education and training programs.

Some psycho-physical testing devices have been used heretofore for testing perception and reaction times of new and high risk drivers, but such devices have been limited in the use thereof and have not been able to adequately demonstrate the influence of hazards that will be encountered under a variety of driving conditions and physical decrement due to blood alcohol conditions.

SUMMARY OF THE INVENTION

The present invention relates to a psycho-physical teach/testing device for driver education and provides a visual arrangement on a panel that includes electrical switches that enables a student to preset control circuits for testing perception, reaction and stopping characteristics under simulated driving conditions. The testing device includes a first mode for testing the perception of a student wherein the time interval required for the student to remove his foot from a simulated accelerator pedal upon a given signal is determined. The testing device also tests reaction time, or that time required to initiate the braking of a vehicle, the reaction time being cumulative with the perception time, and both the reaction and perception characteristics being visually indicated on a read-out clock as a measured time interval.

Another unique feature of applicant's invention resides in factoring into the system a variety of road surface conditions, as well as a plurality of preselected vehicle speeds. Thus, the student being tested can preset the device to simulate a particular road condition at a specific speed and can then determine the interval of time that is required for bringing a vehicle to a stopped position after observing a given signal.

The invention further incorporates in the system as a factor in determining the time interval for testing the student's reaction and stopping characteristics, a simulated blood alcohol concentration. Thus, by dialing a blood alcohol concentration into the system, the read-out clock and stopping distance measurements will be effected accordingly and will visually demonstrate to the student the effect of alcohol on the reactions of a driver.

Accordingly, it is an object of the present invention to provide a psycho-physical teach/testing device for driver education that tests perception, reaction time, and teaches the relationship of these factors to stopping characteristics.

Another object of the invention is to provide a teach/testing device for driver education that measures reaction time of a student by simulating blood alcohol concentrations of predetermined amounts in the student being tested.

Still another object is to provide a teaching device for driver education that teaches stopping characteristics to a student by measuring the distance required to bring the vehicle to a complete stop under simulated conditions effecting road surface and speed of the vehicle.

Still another object is to provide a teach/testing device for driver education that includes a control panel having a plurality of selector switches that are movable to various settings for simulating a variety of driving conditions and vehicular speeds.

Still another object is to provide a teaching and testing device for driver education that includes a control panel for presetting teaching and testing cycles and that further includes simulated accelerator and brake pedals that enable a student to be tested under simulated conditions normally encountered in the driving of a vehicle.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
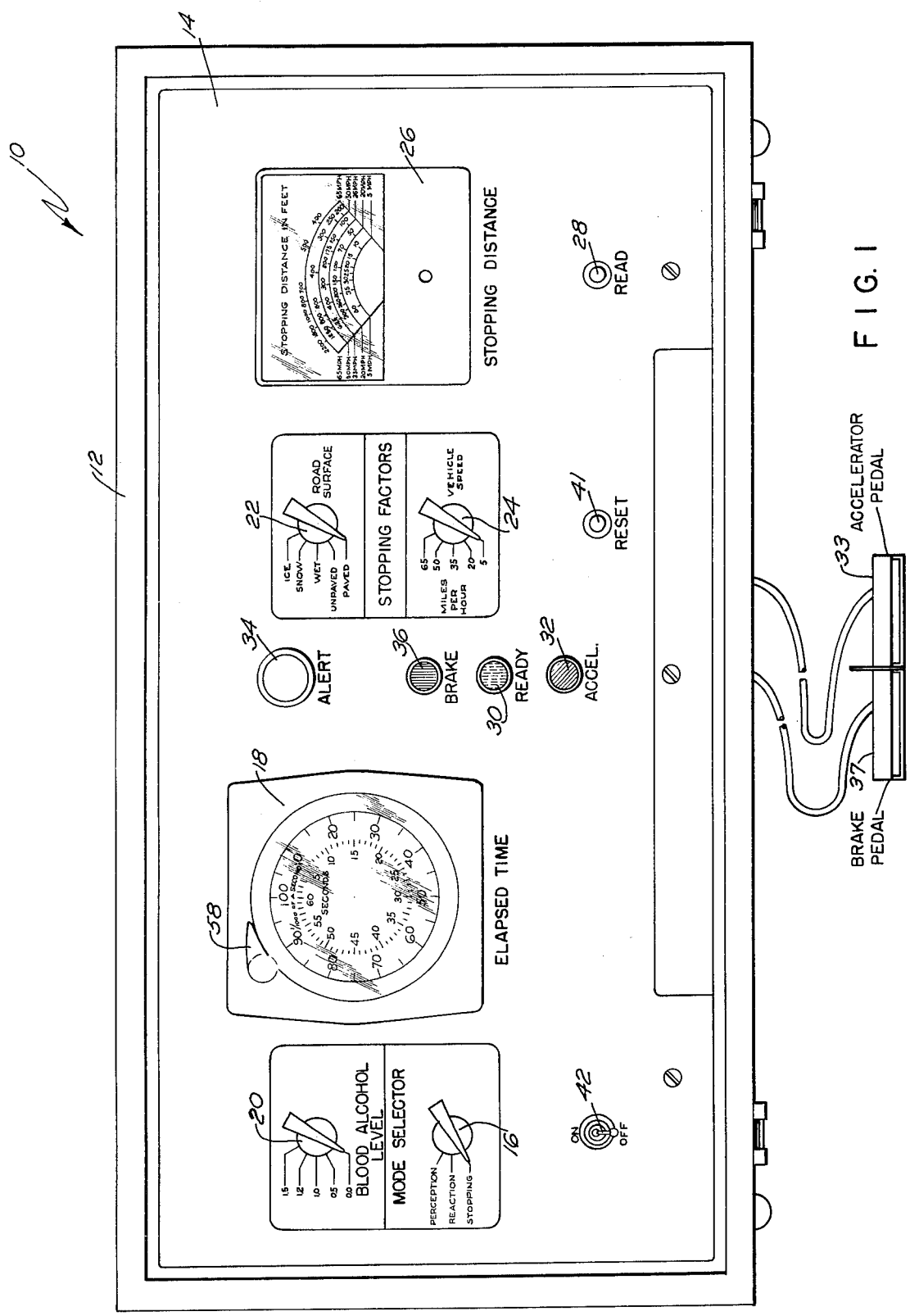
FIG. 1 is a front elevational view of the front panel of the psycho-physical teach/testing device embodied in the present invention.

Referring now to the drawings and particularly to FIG. 1, the teach/testing device as embodied in the present invention is generally indicated at 10 and is located in a housing 12 that includes a front panel 14. The front panel 14 has a plurality of selector switches mounted thereon that provide for setting of the teach/testing device in accordance with a test to be conducted. In this connection a mode selector switch 16 is mounted on the panel 14 and is movable between three settings identified as "perception", "reaction" and "stopping"; and, as will be described, each of these settings represent a particular mode for testing the driving characteristics of a student. Measuring the time for perception and reaction of the student during acceleration and braking is part of the characteristics examined; and, for this purpose, a read-out clock 18 is mounted on the panel 14 and is of the type that determines a time interval in fractions of a second.

One of the novel features of the invention in testing the reaction of the driver in stopping a vehicle is factoring into the test a predetermined setting simulating blood alcohol concentration. For this purpose a blood alcohol level selector switch 20 is mounted on the panel 14 and is movable between a plurality of settings that simulate blood alcohol concentrations up to 0.15 of 1 percent, the highest presumptive level of intoxication presently in use. As will be described, as a blood alcohol concentration setting is dialed into the reaction mode, the measured time for braking a vehicle under simulated conditions increases accordingly.

The present invention is designed to illustrate to a student the differential time involved in stopping a vehicle when a variety of road surface conditions and vehicle speeds are selectively combined. For this purpose, a road surface selector switch 22 is mounted on the front panel 14 and is movable to a variety of settings that simulate road surface conditions, while a selector switch 24 is also mounted on the front panel 14 and is movable to a plurality of settings that simulate the speed of a vehicle. As will be described, the road surface and vehicle speed settings represent stopping factors that increase the elapsed time determined by the read-out clock 18 in a given cycle. The stopping factors are also cumulative with respect to the perception and reaction time measured when testing a student and will be additive to the reading on the read-out clock 18 that accumulates as a result of timing perception and reaction of a student. A stopping distance read-out meter 26 is also mounted on the panel 14 and visually demonstrates to a student the distances required for stopping a vehicle at a simulated speed and under selected driving conditions.

The stopping distance read-out meter 26 represents a tabulation of the total distance required to stop the vheicle when operated at a selected speed, from the time the student perceives the need for stopping until the vehicle comes to rest. A read-out button switch 28, located on the panel 14, activates the meter 26 and enables the student being tested to visually determine the stopping distance in feet that is required to bring a vehicle to rest in accordance with the simulated speed of the vehicle.

In the operation of the testing device, a plurality of colored lamps are mounted on the panel 14 to visually indicate to the student being tested the condition of the testing device, or that a particular action is required. Thus, a ready lamp 30, preferably of an amber color, when energized, indicates that an operating sequence is ready to begin. An accelerator lamp 32 that is preferably green in color indicates that an accelerator switch is closed and that pressure is being applied by the student to an accelerator pedal 33. An alert lamp 34 that is white in color is energized randomly after the accelerator lamp 32 is energized and indicates to the student that a particular function is to be performed. As will be described, when the white alert lamp 34 is energized, the read-out clock 18 is simultaneously energized and will begin a timing cycle.

A brake lamp 36, preferably red in color, is energized when a brake pedal 37 is depressed. The brake lamp 36 is normally energized during a simulated braking period and during which time the read-out clock 18 is moving in an operating cycle. As will be further described, when the red brake lamp 36 is deenergized, the read-out clock 18 stops to indicate the end of the time measuring cycle.

As described above, a student that operates the testing device 10 is tested under simulated driving conditions and reacts in a manner that will indicate an actual reaction under normal operating conditions. In order to effectively simulate actual driving conditions, the accelerator pedal 33 is provided and controls a switch 38 that is electrically connected in circuit to the other components of the device, as will be described. The accelerator pedal 33 is physically located below the panel 14 and is readily accessible to the foot of the student, it being understood that the switch 38 is closed upon depression of the pedal 33 by the student. The brake pedal 37 is located adjacent to the accelerator pedal 33 and simulates the approximate position of an actual brake pedal relative to that of an accelerator in a vehicle. A brake pedal switch 40 that is closed by the brake pedal 33 is also electrically interconnected in the circuit to the components of the device as will be described. If it is necessary to reset the cycle at any time during operation of the device, a reset switch 41 is provided and is conveniently closed by a button mounted on the panel 14.

Figure 2:
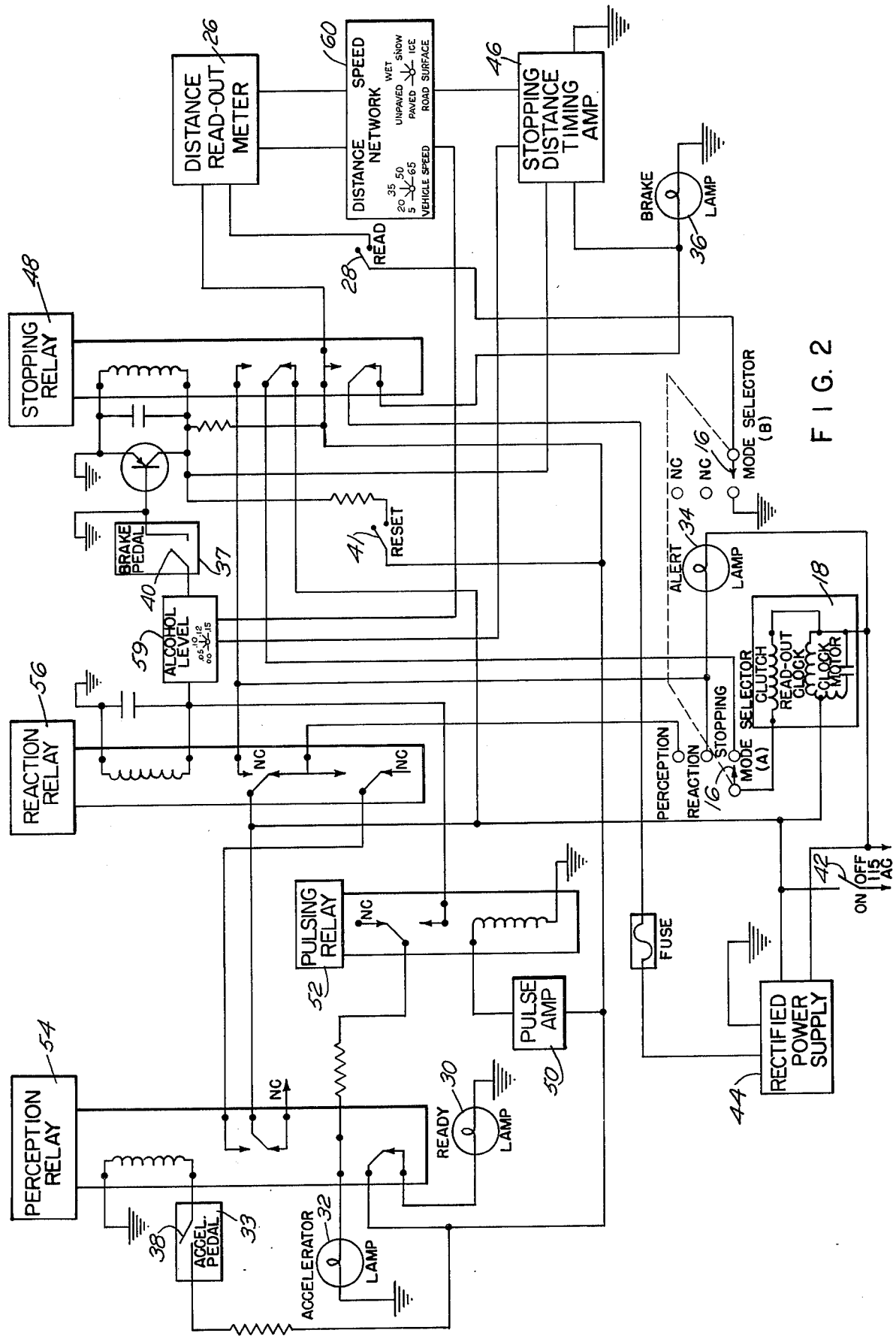
FIG. 2 is a diagrammatic illustration of the electrical circuit as embodied in the present invention.

In an operational cycle, the testing device is activated by moving a main switch 42 to the "on" position thereof, wherein a DC power supply indicated at 44 in FIG. 2 is energized. Referring now to FIG. 2, it is seen that when the switch 42 is moved to the on position and the power supply 44 is energized, the current flows momentarily through a timing amplifier 46 for energizing the coil of a relay 48. The timing amplifier 46 is of conventional construction and includes a circuit that is operative to effect the time record on the read-out clock 18 as influenced by a blood alcohol level network and a distance/speed network as will be described. The brake lamp 36 is momentarily energized; and upon energizing of the stopping relay 48, the ready lamp 30 is energized to indicate that an operational sequence is ready to begin. Simultaneously with the energizing of the ready lamp 30, a pulse amplifier 50 having a conventional circuit is energized to intermittently close the circuit to a pulsing relay 52 for a predetermined interval. The motor of the read-out clock 18 is also energized by closing of the main switch 42; although, the clock will not begin a timing cycle until a clutch circuit thereof is energized in an operational cycle.

When it is desired to test the perception characteristics of a student, the mode selector switch 16 is dialed to the perception setting on the panel 14. Since the lamp 30 is energized at this point to indicate a ready position, the student then steps on the accelerator pedal 33 to close the accelerator switch 38 which closes the circuit to a perception relay 54. Upon energizing of the perception relay 54, the amber lamp 30 is deenergized and the green accelerator lamp 32 is energized to indicate that pressure is being applied to the accelerator pedal 33. At a random interval that occurs within the period that the pulsing relay 52 is energized by the pulse amplifier 50, the circuit to a reaction relay 56 is closed. This causes the white alert lamp 34 to glow and the clutch of the read-out clock 18 to be energized, thereby beginning a read-out cycle on the clock. The perception time of the student in reacting to observing the glowing white alert lamp and lifting his foot from the accelerator is then measured on the read-out clock in fractions of a second. When pressure on the accelerator pedal is relieved, the switch 38 is opened and the perception relay 54 is deenergized, thereby causing the read-out clock 18 to stop and the amber ready lamp 30 to glow. The reading on the readout clock is noted, and a reset arm 58 on the clock is depressed to return the hand thereof to the starting position.

When it is desired to test the reaction of the student and to determine the time required for the student to move this foot from the accelerator pedal 33 to the brake pedal 37 to apply a braking action, the mode selector switch 16 is dialed to the reaction setting, and the device is ready for operation of the reaction cycle. The reaction mode is cumulative with the perception mode and thus, when the accelerator pedal switch 38 is depressed in the reaction cycle, the events occur as in the perception mode described above. However, when the student lifts his foot from the accelerator pedal 33 to open the accelerator switch 38, the read-out clock 18 continues to operate until the student closes the brake switch 40 by depressing the brake pedal 37. When the brake switch 40 is closed, the reaction relay 56 is deenergized, thereby causing the alert lamp 34 to be deenergized and the read-out clock 18 to discontinue operation. The circuit to the stopping relay 48 is interrupted to cause this relay to deenergize, thereby closing the circuit to the brake lamp 36. Energizing of the brake lamp 36 indicates that the brake pedal 37 has been depressed. Almost immediately, the stopping relay 48 is reenergized, thereby causing the ready lamp 30 to once again glow and the pulsing amplifier 50 to begin cycling to produce random and intermittent pulsing of the pulsing relay 52.

Since the reaction mode is cumulative with the perception mode, the elapsed time indicated on the read-out clock 18 following completion of the reaction cycle will not only indicate the time elapsed following removal by the student of his foot from the accelerator pedal 33, but will also indicate the additional time elapsed for the student to depress the brake pedal 37.

One of the features of the invention is the factoring into the reaction cycle a blood alcohol concentration that will visually indicate to the student the effect of alcohol on a driver's reactions. The blood alcohol level selector switch 20 is electrically interconnected to the brake switch 37 and the reaction relay 56 through a network indicated at 59 which will produce a time delay on the read out clock in accordance with the setting of the selector switch 20. The increments as defined in the blood alcohol level network have been predetermined in accordance with prior known accumulated data; and, therefore, the additional time recorded on the read-out clock 18 as a result of factoring the blood alcohol network into the circuit is a function of the selected blood alcohol level setting as determined by the location of the selector switch 20. In this connection the reaction time for any given cycle is influenced by dialing in a blood alcohol concentration of up to 0.15 of one percent, the highest presumptive level of intoxication presently in use. According to behavioral data that has been compiled for drivers tested under the influence of alcohol, there is consistent deterioration of the faculties of the individual when the blood alcohol level reaches 0.06 percent and above. This data is consistent with the Uniform Vehicle Code (1962 revised) in which legal presumptions are made in accordance with chemical tests that indicate the following:

1. Alcohol concentration in the body of ten hundredths of one percent (0.10%) or more is prima facia evidence of being under the influence of alcohol.

2. With concentrations between 0.05 percent and 0.10 percent, there is no presumption either way but the indication of being under the influence of alcohol will be considered along with other evidence.

3. Alcohol concentration in the body of five hundredths of one percent (0.05%) or less is presumptive evidence of not being under the influence of alcohol.

It is understood, that the greater the alcohol concentration, the more likelihood of accident involvement of a driver. This has been translated by one authority into the following statistical data. When the alcohol level reaches 0.06% the probability of causing an accident is twice that of no alcohol level; at 0.10% the probability is six times greater; and at 0.15% it is 25 times greater.

It is seen that the inclusion of the blood alcohol level factor into the reaction mode, will dramatically illustrate to the student the effect of alcohol concentration in the system on the reaction of the driver to a typical driving situation.

The present invention also provides for factoring into the testing device various vehicle speeds and road surface conditions, so that the student will have a more clear understanding of the stopping time/distance relationships and the stopping time/road surface relationships, in addition to the reaction time factor that has been described above. As illustrated in FIG. 1, the selector switch 24 for the vehicle speed stopping factors may be dialed to a plurality of settings that have been arbitrarily selected at 5, 20, 35, 50 and 65 miles per hour. A road surface can also be selected for the stopping mode by the selector switch 22, and such road surfaces are those normally encountered under most driving conditions such as paved, unpaved, wet, snow and ice.

The stopping factors represented by vehicle speed and road surface conditions are included in a circuit network indicated at 60 in FIG. 2, the network 60 being connected in circuit to the distance read-out meter 26. The read-out switch 28 which closes the circuit to the distance read-out meter, is utilized to determine a reading on the meter 26 after a stopping cycle has been completed by the student. It is understood that the circuit network 60 that represents the selected vehicle speed and road surface conditions will provide a predetermined delay for operating the timing amplifier 46.

In the stopping mode operation, a cycle is begun by setting the mode selector switch 16 on the stopping position. The vehicle speed and road surface selector switches 22 and 24 are moved to selected positions, and the operational sequence of events is substantially the same as described above in the operation of the reaction mode. Thus, the student, after observing the glowing amber ready lamp 30, depresses the accelerator pedal 33 which closes the circuit to the green accelerator lamp 32 and causes the ready lamp 30 to deenergize. When the pulsing relay 52 energizes the white alert lamp 34, to begin operation of the read-out clock, the student promptly lifts his foot from the accelerator pedal 33 and depresses the brake pedal 37 as quickly as possible. The read-out clock 18 continues to operate and the red brake lamp 36 continues to glow after the stopping relay 48 has been energized until the interval elapses governed by the settings of the surface/speed selector switches which control the timing amplifier 46. The stopping relay 48 automatically reenergizes, thereby energizing the ready lamp 30 and deenergizing the brake lamp 36. The distance read-out meter 26 is then read by depressing the read-out switch 28. Since the read-out meter is calibrated in accordance with the selected speed and the stopping distances in feet, depressing the read-out switch 28 will cause the needle in the read-out meter to move to that position as determined by the road surface and speed network settings. The time elapsed on the read-out clock 18 is also read thereon, the elapsed time being a function of the road surface/vehicle speed stopping factors as dialed into the circuit.

If the blood alcohol level circuit is in the activated position as previously described, the setting thereof will add an additional time and distance to the selected road surface/vehicle speed factored into the system. Insofar as the stopping time/distance relationships are concerned, this data is emperical in nature and has been predetermined in accordance with statistical information compiled by motor vehicle agencies. The stopping distance readings as indicated on the distance read-out meter 26 are approximate distances which are used to establish relationships between stopping time and stopping distance as influenced by the physical laws which govern the deceleration of vehicles under normal conditions at the speeds and on the road surfaces indicated. Variations in stopping distances can also be caused by tire and brake conditions, and various other factors; but average conditions have been utilized for establishing the relationship as illustrated and described.

It is seen that the testing device as embodied herein is designed to compute vehicular stopping time/distance relationships under a variety of road surface conditions and speeds. Furthermore, the device can measure perception time, simple reaction time and reaction time as influenced by blood alcohol level up to 0.15 of one percent. The elapsed time increments are recorded on the read-out clock 18 in hundredths of a second and the stopping distances are automatically tabulated in feet which are read on the distance read-out meter 26 by pressing the read-out switch 28. The device is designed to provide the student with an appreciation of the distances required to bring a vehicle to a halt from the instant of perception of a hazard to the actual stopping of the vehicle.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A psycho-physical teaching and testing device for driver education, comprising a first mode for testing perception characteristics of a user of the device, a second mode that is cumulative with said first mode for testing reaction characteristics, a third mode that is cumulative with said first and second modes for relating stopping characteristics thereto, and means for selectively programming variable stopping factors into said third mode, said second mode including means for simulating degrees of blood alcohol level in the user, wherein the time for reacting to a braking operation is correspondingly affected.

2. A psycho-physical teaching and testing device for driver education, comprising a first mode for testing perception characteristics of a user of the device, a second mode that is cumulative with said first mode for testing reaction characteristics, a third mode that is cumulative with said first and second modes for relating stopping characteristics thereto, and means for selectively programming variable stopping factors into said third mode, said stopping factors including a network having a plurality of settings that simulate predetermined road conditions, said second mode including means for simulating degrees of blood alcohol level in the user, wherein the time for reacting to a braking operation is correspondingly affected.

3. A psycho-physical teaching and testing device as claimed in claim 2, said stopping factors further including a network in which a plurality of pre-selected vehicle speeds are simulated.

4. A psycho-physical teaching and testing device as claimed in claim 3, a distance read-out meter communicating with said networks and registering stopping distances in accordance with time intervals established in said first and second modes and the settings in said networks.

5. A psycho-physical teaching and testing device for driver education, comprising a first mode for testing perception characteristics of a user of the device, a second mode that is cumulative with said first mode for testing reaction characteristics, a third mode that is cumulative with said first and second modes for relating stopping characteristics thereto, and means for selectively programming variable stopping factors into said third mode, said first mode including a pedal operated switch that simulates an accelerator pedal, a perception relay located in circuit with said switch and being energized upon the closing thereof, an accelerator lamp that is energized in response to energizing of said perception relay for indicating to the user that the pedal operated switch is closed, thereby simulating pressure by the driver on an automobile accelerator, a normally energized pulsing amplifier, a pulsing relay periodically energized by said pulsing amplifier at random intervals, an alert lamp located in circuit with said pulsing relay and energized in response to the energizing thereof for indicating the start of a perception cycle, and a read-out clock responsive to energizing of said pulsing relay for measuring the time required for the user to release the pedal operated switch after observing that the alert lamp has been energized.

6. A psycho-physical teaching and testing device as claimed in claim 5, said second mode including a second pedal operated switch that simulates a brake pedal, a reaction relay that is energized upon closing of the brake switch thereby deenergizing said alert lamp, and a brake lamp that is energized in response to energizing of said reaction relay, said read-out clock being responsive to energizing of said reaction relay for measuring the time required for the user to close the brake switch after releasing the accelerator switch and that is cumulative to the time measured for releasing the accelerator switch after observing that the alert lamp has been energized.

7. A psycho-physical teaching and testing device as claimed in claim 6, a timing circuit including settings simulating blood alcohol level concentration connected in circuit to said reaction relay, the read-out clock being responsive to said timing circuit and a selected blood alcohol level concentration setting to factor in an increased time interval of the total time measured to simulate alcohol intake by the user.

8. A psycho-physical teaching and testing device as claimed in claim 7, said programming means in said third mode including a network defined by a plurality of settings that simulate a plurality of vehicle speeds and various road surface conditions, said speed and road condition settings being included in said timing circuit, wherein said read-out clock is responsive to the timing circuit and inclusion of a selected speed and/or road condition setting therein to factor in an increased time interval of the total time measured to simulate a specific speed of a vehicle and a road condition encountered.

* * * * *